(12) United States Patent  
Hoebel et al.

(10) Patent No.: US 7,828,297 B2  
(45) Date of Patent: Nov. 9, 2010

(54) LEAF SEAL, IN PARTICULAR FOR A GAS TURBINE

(75) Inventors: Matthias Hoebel, Baden (CH); Nigel Anthony Rhodes, Newbold Verdon (GB); Ian James Summerside, Baden (CH)

(73) Assignee: Alstom Technology Ltd., Baden (CH)

( * ) Notice: Subject to any disclaimer, the term of this patent is extended or adjusted under 35 U.S.C. 154(b) by 269 days.

(21) Appl. No.: 11/760,964

(22) Filed: Jun. 11, 2007

(65) Prior Publication Data

US 2008/0007008 A1    Jan. 10, 2008

Related U.S. Application Data

(63) Continuation of application No. PCT/EP2005/056164, filed on Nov. 23, 2005.

(30) Foreign Application Priority Data

Dec. 11, 2004    (DE) ....................... 10 2004 059 858

(51) Int. Cl.  
*F16J 15/447* (2006.01)  
(52) U.S. Cl. ...................... 277/412; 277/355  
(58) Field of Classification Search ................ 277/355, 277/412, 417  
See application file for complete search history.

(56) References Cited

U.S. PATENT DOCUMENTS

| | | | |
|---|---|---|---|
| RE30,206 E | 2/1980 | Ferguson et al. | |
| 4,618,152 A | 10/1986 | Campbell | |
| 4,997,028 A * | 3/1991 | Townsend | 165/9 |
| 5,597,167 A | 1/1997 | Snyder et al. | |
| 5,755,445 A | 5/1998 | Arora | |
| 5,944,320 A | 8/1999 | Werner et al. | |
| 6,267,381 B1 | 7/2001 | Wright et al. | |
| 6,343,792 B1 * | 2/2002 | Shinohara et al. | 277/355 |
| 6,811,154 B2 * | 11/2004 | Proctor et al. | 277/355 |
| 6,860,484 B2 * | 3/2005 | Urlichs | 277/412 |
| 7,159,872 B2 * | 1/2007 | Nicholson et al. | 277/355 |
| 7,201,378 B2 * | 4/2007 | Kono | 277/355 |
| 7,334,328 B2 * | 2/2008 | Uehara et al. | 29/888.3 |
| 7,487,588 B2 * | 2/2009 | Hogg et al. | 29/888.3 |
| 2002/0105146 A1 * | 8/2002 | Uehara et al. | 277/355 |
| 2003/0071423 A1 | 4/2003 | Urlichs | |
| 2003/0111797 A1 * | 6/2003 | Chung et al. | 277/355 |
| 2004/0232621 A1 * | 11/2004 | Kono | 277/355 |
| 2005/0125983 A1 * | 6/2005 | Uehara et al. | 29/458 |
| 2006/0061040 A1 * | 3/2006 | Nicholson et al. | 277/355 |
| 2007/0018408 A1 * | 1/2007 | Kono | 277/355 |
| 2007/0085277 A1 | 4/2007 | Rhodes et al. | |
| 2007/0102886 A1 * | 5/2007 | Uehara et al. | 277/355 |

(Continued)

FOREIGN PATENT DOCUMENTS

DE    3335570    7/1984

(Continued)

*Primary Examiner*—Alison K Pickard  
(74) *Attorney, Agent, or Firm*—Leydig, Voit & Mayer, Ltd.

(57) ABSTRACT

A leaf seal for sealing a shaft rotating about an axis, in particular in a gas turbine, includes a plurality of spaced-apart leaves disposed in a concentric circle around the axis and fixed in position. Each of the leaves includes a surface oriented essentially parallel to the axis and an integrally formed element configured to position and retain the leaves in the leaf seal.

6 Claims, 6 Drawing Sheets

U.S. PATENT DOCUMENTS

2007/0119909 A1    5/2007  Rhodes
2007/0120326 A1    5/2007  Rhodes et al.
2008/0007009 A1*   1/2008  Williams .................... 277/355
2008/0099999 A1*   5/2008  Williams .................... 277/355

FOREIGN PATENT DOCUMENTS

| | | |
|---|---|---|
| DE | 19712088 | 10/1998 |
| DE | 102004020378 | 11/2005 |
| EP | 1302708 | 4/2003 |
| EP | 1 479 953 | 11/2004 |

* cited by examiner

LEAF SEAL, IN PARTICULAR FOR A GAS TURBINE

This application is a continuation of International Patent Application No. PCT/EP2005/056164, filed on Nov. 23, 2005, which claims priority to German Patent Application No. DE 10 2004 059 858.4, filed on Dec. 11, 2004. The entire disclosure of both applications is incorporated by reference herein.

TECHNICAL FIELD

The present invention relates to sealing in rotating machines and in particular relates to a leaf seal for sealing a shaft rotating about an axis.

BACKGROUND

A gas turbine includes a rotor, on which various stages with compressor blades and turbine blades are provided, and of a stator housing. The rotor is mounted in bearings at each end of the rotor shaft.

The control of the gas flow inside the gas turbine is of paramount importance with regard to both the functionality and the effectiveness. Sealing techniques are used at various locations along the rotor shaft in order to reduce the axial gas flow along the shaft. This is especially important next to the bearings in order to prevent the oil which is used in the bearings from overheating due to the hot gases of the gas flow.

Two types of sealing techniques are traditionally used in this situation—usually alternatively, sometimes also in combination. These are labyrinth seals and brush seals.

Labyrinth seals have no metal-to-metal contact between the rotor and the stator; the sealing effect is therefore relatively small. However, they offer the advantage of low rotational friction and of a therefore virtually unlimited service life.

On the other hand, brush seals have higher friction losses on account of the friction between the bristle ends and the rotor shaft. This results in wear, which limits the service life of the seal. However, brush seals stem the axial gas flow more effectively, in particular in the case of higher axial pressure differences.

The use of these technologies for sealing in gas turbines has numerous restrictions. Firstly, the axial pressure difference that they can withstand is still fairly low. In the case of the brush seals, this is due to the bristles, which have the same stiffness in the axial and circumferential directions: high pressures can cause the bristles to blow back on themselves in the axial direction. The capability of the seals to allow a significant radial movement and to resist it is also low.

The design of a brush seal is often a compromise between the use of a supporting plate, which is intended to give sufficient axial support, and the non-restriction of the radial movement.

In order to avoid the disadvantages of the known brush seal, a leaf seal has been proposed in U.S. Pat. No. 6,267,381 B1, this leaf seal performing the same function as either a labyrinth seal or a brush seal but having the advantages of both. Instead of the bristles, which are produced from wires of circular cross section, thin metal leaves are assembled in a certain arrangement (see, for example, FIG. 2 of U.S. Pat. No. 6,267,381 B1 or FIG. 1 of the present application). The leaves, which are oriented with their surfaces essentially parallel to the axial direction, are much stiffer in the axial direction than in the circumferential direction. Thus the seal can withstand higher pressure differences without restricting their possibilities for allowing radial movements. The wide region on the rotor, which is swept by the tips of the leaves, provides the opportunity of producing a hydrodynamic force during operation, and this hydrodynamic force can separate the leaf tips from the shaft. In this way, a distance of a few microns can be produced and maintained, so that the wear, the friction heat and the friction losses can be reduced virtually to zero.

The basic design relates to a number of thin metal leaves which have a controlled air gap between them and are fastened at a predetermined angle to the radius. The air gap is a critical design parameter: it enables an air flow to occur in order thus to produce the hydrodynamic effect; however, it must not be so large as to allow an excessive axial leakage flow.

Two variants of leaf seal designs are possible; in the one variant the leaves are blown downward, but in the other they are blown upward. In the variant having the leaves blown downward, there is a distance between the leaf tips and the shaft during the assembly and start-up, and this gap is reduced to very small values by the use of an air flow between the leaves. On the other hand, in the variant having the upward blowing, there is slight mutual influencing between the leaf tips and the shaft during the start-up, and a distance is produced when the shaft is accelerated. In both cases, the flow of the medium through the air gaps between the leaves is critical, as is the control of the seal's inside diameter, which is produced by the leaf tips.

The air flow through the leaves can be varied by using a front and a rear plate which leave a narrow gap free between the surfaces of the leaf stack and the plates (see abovementioned FIGS. 1 and 3). A careful design of these geometries makes it possible to control the upward or downward blowing effects. It may also be desirable to assist the downward blowing effect by an active pressure feed along the length of the leaves or inward from the front side or from the rear directions.

One of the other main advantages of the leaf seal concept is a greater tolerance of the radial movement than in labyrinth or brush seals. This requires a large distance there between the inside diameter of the front and rear end plates and the shaft.

Depending on the geometry selected for the seal and on the diameter of the shaft to be sealed, the number of leaves can be several thousand or umpteen thousand. The accuracy with which said leaves can be produced, assembled and connected, in the course of which a reproducible air gap between each pair of leaves is ensured, is critical for the successful implementation of every possible seal design.

The joining method for fixing the leaves in their position could be a mechanical technique, such as clamping in place, welding or brazing or any possible combination thereof. It is quite obviously important that a minimum disturbance of the leaves or of their relative positions occurs during the joining process.

SUMMARY OF THE INVENTION

An object of the present invention is to provide a leaf seal which avoids the disadvantages of known leaf seals and to provide improved manipulation, positioning and/or retention of the leaves.

The present invention provides a leaf seal for sealing a shaft rotating about an axis, in particular in a gas turbine. The leaf seal includes a plurality of spaced-apart leaves arranged in a concentric circle around the axis and fixed in position. The leaves each have a surface oriented essentially parallel to the axis and each include an integrally formed element for positioning and retaining the leaves in the leaf seal, each element including at least one laterally projecting arm. During both manual assembly and automated assembly, this makes the leaves easier and simpler to put together to form leaf stacks and to process them further into the finished leaf seal and with increased precision.

According to a preferred refinement of the invention, the elements for positioning and retaining the leaves comprise one or more laterally projecting arms. In particular, the handling of the leaves and putting them together to form leaf stacks is further improved by the arms being of asymmetrical design relative to a center line, running in the longitudinal direction, of the leaves.

The asymmetry can be achieved by an arm being provided only on one side.

However, it is also conceivable for two opposite arms which project laterally to a different extent to be provided.

Furthermore, asymmetry can be brought about by two opposite arms being provided which are located at different heights as viewed in the longitudinal direction.

Spacers are preferably provided in order to set the distance between successive leaves in the leaf seal; the arms in this case are arranged in the region of the spacers.

In particular, it has proved successful for the spacers to be arranged in the outer end region of the leaves.

The spacers may be formed as integral elements on the leaves as regions of greater thickness.

However, the spacers may also be designed as elements embossed in the leaves, each leaf, in the radial direction, preferably having at least two embossed spacers which are arranged one behind the other and fix the position of the leaves relative to one another.

However, it is also conceivable for the spacers to be designed as separate elements.

So that air can be directed into the intermediate spaces between the leaves, it is advantageous if, in the region of the arms or spacers, through-holes are provided in the leaves perpendicularly to the leaf plane.

A further improvement in the properties of the leaf seal can be achieved by additional elements for influencing the mechanical and/or fluidic properties of the leaf being provided on the leaves. The additional elements are preferably designed as ribs which run on a longitudinal edge and on the bottom transverse edge and merge into one another at a corner of the leaf. Especially favorable mechanical properties of the leaf are obtained if the leaf has a head part, at which it is fastened in the leaf seal, and if the rib running on the longitudinal edge ends in front of the head part.

Finally, the fastening of the leaves in the leaf seal can be improved by the leaves each being subdivided into a head part having the spacer and a sealing part and by the sealing part being inclined relative to the head part.

BRIEF DESCRIPTION OF THE DRAWINGS

The present invention is to be explained in more detail below with reference to exemplary embodiments in connection with the drawings, in which.

DETAILED DESCRIPTION

Figure 1:
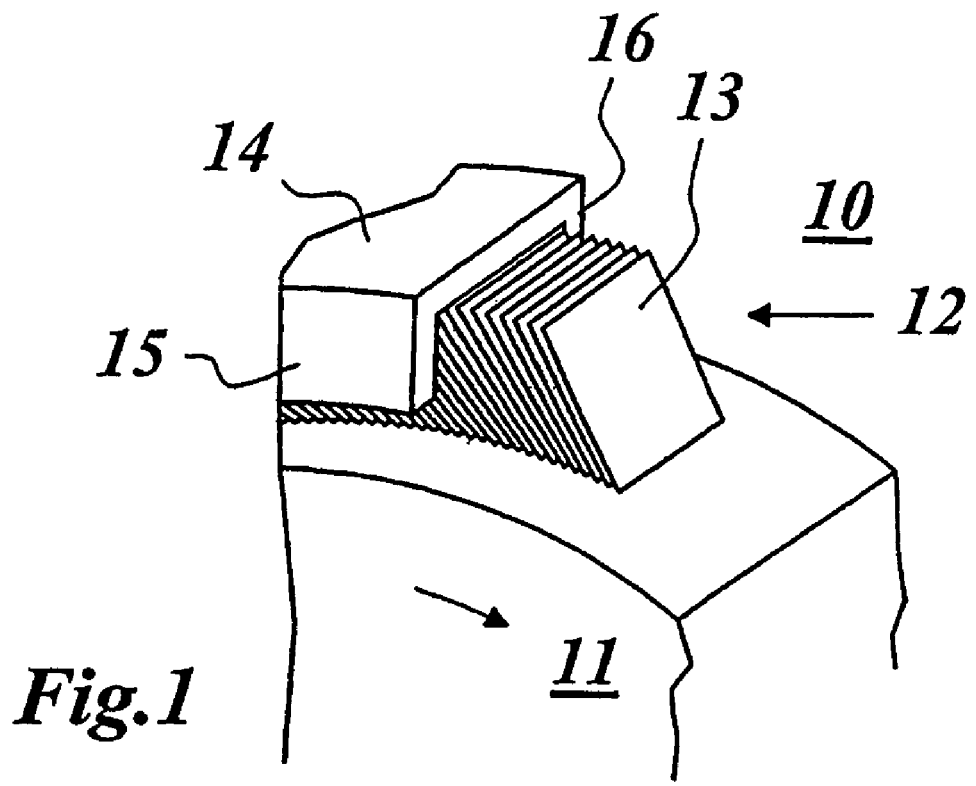
FIG. 1 shows a perspective side view of the typical construction of a leaf seal as used in a gas turbine.
Figure 2:
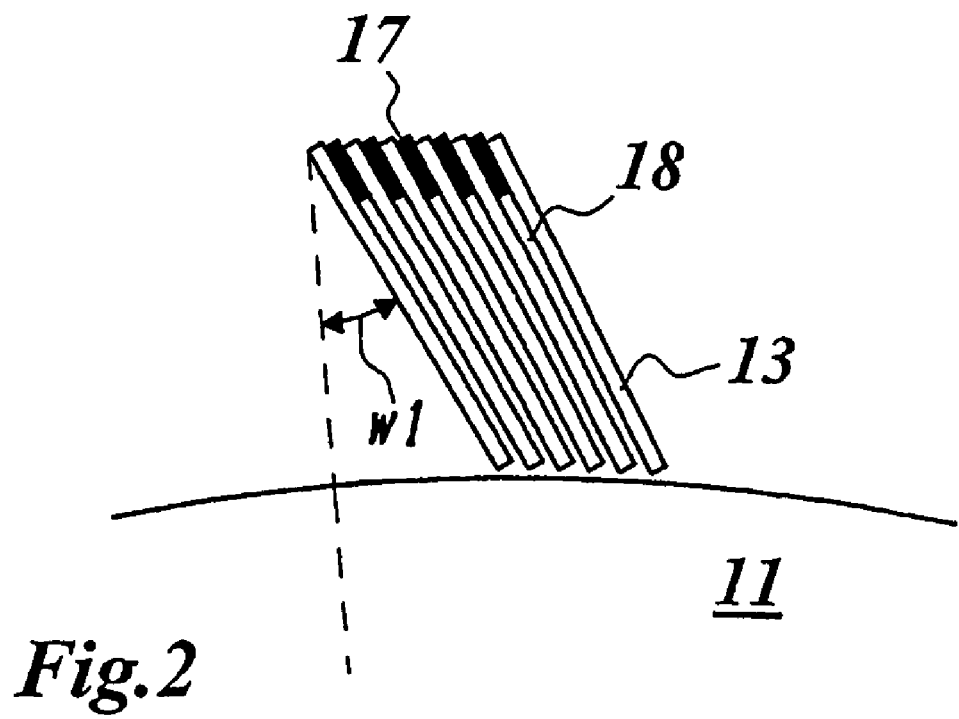
FIG. 2 shows, in the axial direction, the side view of the arrangement, inclined from the radial direction, of individual leaves with their intermediate spacers.

Shown in FIG. 1 in a perspective side view is the typical construction of a leaf seal as used in a gas turbine. The leaf seal 12 seals a rotor shaft 11, rotating in the arrow direction, of the gas turbine 10 with respect to a housing 14. A stack of tightly spaced-apart thin leaves 13 is arranged in a ring in the annular intermediate space between the rotor shaft 11 and the housing 14. With their surface, the leaves 13 are oriented parallel to the axis of rotation of the machine. According to FIG. 2, the leaves are tilted from the radial direction by an angle w1 and have a narrow gap or intermediate space 18 between them, which is preferably established by spacers 17 arranged between the leaves 13. The spacers 17 of FIG. 2 are shown as separate elements. However, they may also be integrated in the leaves as shown in FIGS. 4-6 and 11.

Figure 3:
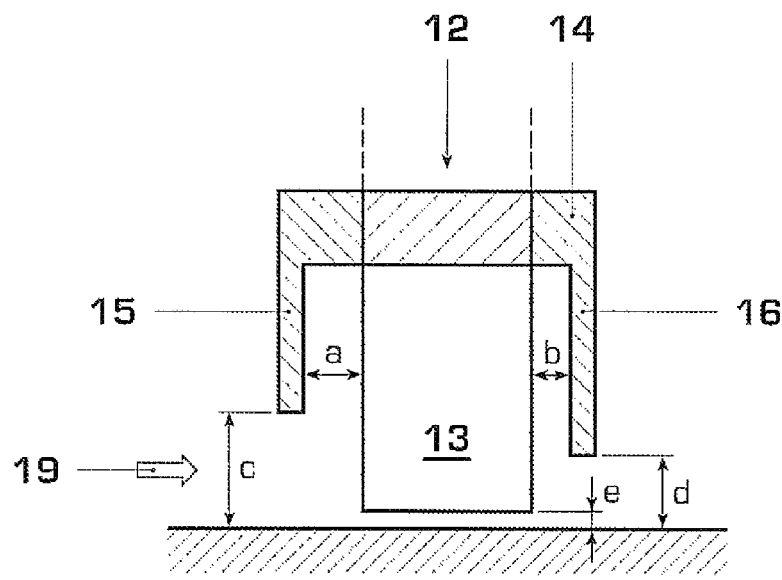
FIG. 3 shows the view of a leaf seal, comparable with FIG. 1, in the circumferential direction, with a front and a rear end plate.

According to FIGS. 1 and 3, the air flow through the leaves 13 can be varied by using a front and a rear end plate 15 and 16, respectively, which leave a narrow gap free between the surfaces of the leaf stack and the end plates 15, 16 (distances a and b in FIG. 3). A careful design of the these geometries makes it possible to control the upward and downward blowing effects mentioned at the beginning. It may also be desirable to assist the downward blowing effect by an active pressure feed along the length of the leaves or inward from the front side or from the rear directions.

One of the other main advantages of the leaf seal concept shown in FIG. 1 or 3 is a greater tolerance of the radial movement than in labyrinth or brush seals. This requires a large distance between the inside diameter of the front and rear end plates 15, 16 and the rotor shaft 11 (distances c and d in FIG. 3). The gap between the leaves 13 and the rotor shaft (distance e in FIG. 3) is only a few microns.

Figure 5:
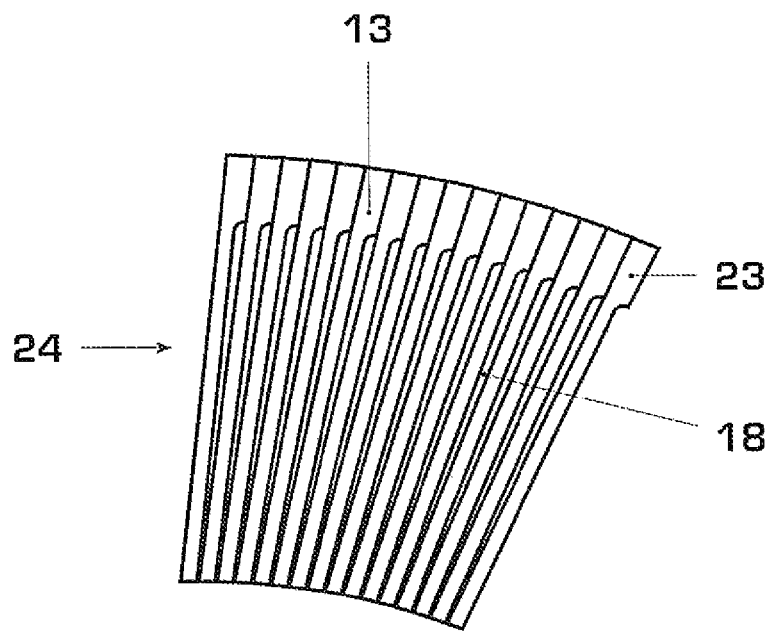
FIG. 5 shows, as viewed in the axial direction, a stack of leaves with integral spacers of constant thickness according to another preferred exemplary embodiment of the invention.
Figure 6:
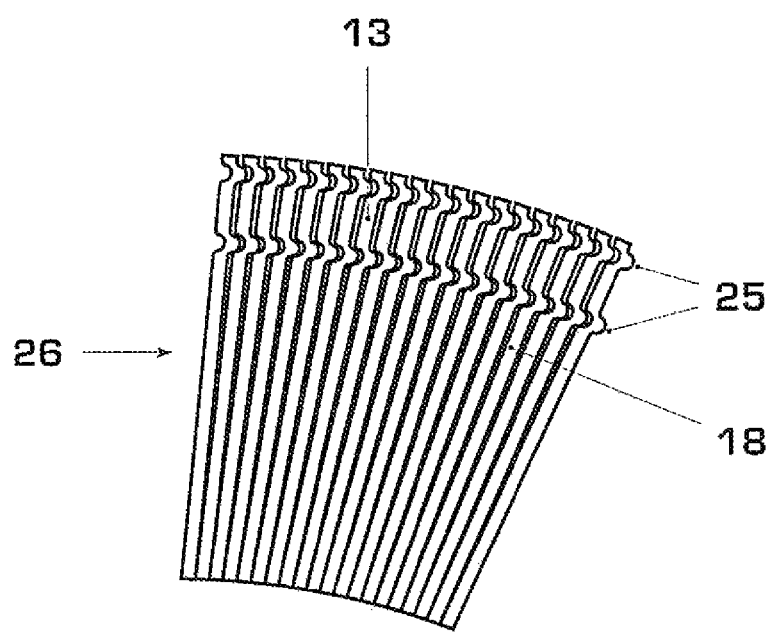
FIG. 6 shows, in an illustration comparable with FIG. 5, a stack of leaves with integral, embossed pairs of spacers according to another preferred exemplary embodiment of the invention.

The leaves 13 may be produced with an integral spacer, so that no separate spacer is required in order to produce the requisite air gap between the leaves when the leaves are brought together or are connected to one another in the leaf seal. The integral spacers can be produced in different ways, as shown in FIGS. 5 and 6. According to FIG. 5, the leaves 13 of the leaf seal 24 are produced with regions of different thickness. The regions having the larger thickness act as spacers 23, on account of which a gap 18 is produced between the active sealing regions of the adjacent leaves. The different thicknesses can be produced, for example, by photochemical processing of the metal sheets used for the leaves. Alternatively, selected regions can be masked by a printing process, such as, for example, screen printing or ink jet printing, in order to subsequently reduce the thickness of nonmasked regions by etching or increase their thickness by a plating process.

According to FIG. 6, integral spacers 25 in the form of beads which are arranged one behind the other in the radial direction at a distance apart can be embossed in the leaves 13 of the leaf seal 26 by means of an embossing process. Within the embossing process, the leaves 13 can at the same time be punched as an entity out of a rolled metal sheet. The embossed spacers 25 give the leaf stack bending elasticity, which can be used during the assembly of the leaf seal in order to control the size of the air gap 18.

Means of positioning and retaining the leaves, which are integrally formed on the leaves, are especially important for the manipulation and positioning of the individual leaves and for putting them together in the leaf stack forming the leaf seal. Leaves 13*a-d* according to FIG. 7 having integrally formed arms 27*a, b*, 28, 29*a, b* or 30*a, b* which project in the top part of the leaf laterally to one side or to two opposite sides make it easier to put the leaves together (in an automated manner) in a holder before the subsequent joining process. The arm or arms 27*a, b*, 28, 29*a, b* and 30*a, b* permit defined positioning in the radial direction and help during the control of the tilt angle of the leaves.

The leaf 13*a* shown in FIG. 7*a* has two arms 27*a, b* which are formed symmetrically to the center line 46. However, a configuration of the arms which has certain asymmetry relative to the center line 46, as is the case in the embodiments in FIGS. 7*b-d*, is advantageous. If the leaf seal is assembled manually, the asymmetry enables the assembler to easily recognize leaves possibly put together incorrectly, or makes it impossible to assemble the seal from the outset due to the leaves incorrectly put together.

If the assembly is automated, the correct feeding of the parts in the correct orientation is crucial. In this case, the asymmetry permits the use of automated orientation processes which are based on a deviation of the geometric center from the center of mass.

In the example in FIG. 7*b*, the asymmetry at the leaf 13*b* is produced by an arm 28 being provided only on one side. In the example in FIG. 7*c*, the leaf 13*c* has two opposite arms 29*a* and 29*b* which project laterally to a different extent and thereby produce asymmetry. In the example in FIG. 7*d*, on the leaf 13*d*, two arms 30*a* and 30*b* are arranged at different heights in the longitudinal direction.

Figure 7:
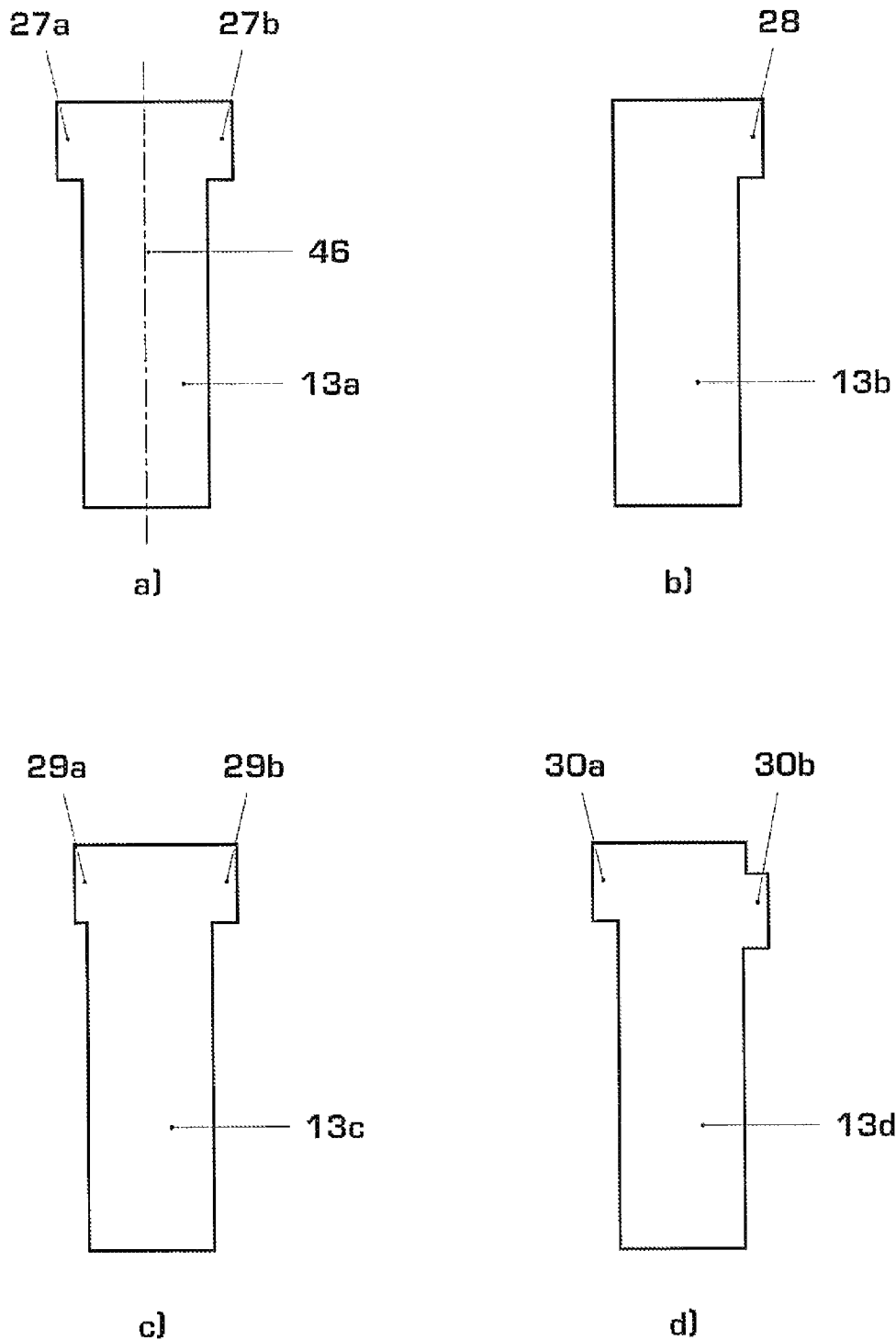
FIG. 7 shows, in various partial figures (FIGS. 7a-d), individual leaves with symmetrical and asymmetrical arms, for making it easier to put said leaves together, according to a further preferred exemplary embodiment of the invention.

In the exemplary embodiments shown in FIG. 7, the arms are arranged at the (top) end of the leaf, at which the leaf is also fixed in the leaf seal. However, it may also be conceivable and desirable in certain cases to provide the arms at other points of the leaf. The configurations of the arms must also always be taken into account in the case of separate spacers, provided separate spacers are used in the leaf seal (in this respect see also FIGS. 9 and 10).

If the arms are of mechanically robust design, a metallurgical connection between the leaves may be unnecessary. The structural positioning and retention of the leaves may then be effected by the housing (see 14 in FIG. 1) in which the arms are accommodated.

For leaf seals having the possibility of an active air feed for assisting the downward blowing effect or the blowing effect, special configurations may be provided at the leaves. Such configurations associated with the air feed are reproduced in FIGS. 8, 9 and 10. The air feed may be effected in the radial direction or via the front side of the leaf packing. By means of through-holes 31 or 36, respectively, in the individual leaves 13*e* or the stacks of leaves 13*f* and spacers 33, an annular chamber is formed in the leaf seal, and this annular chamber acts as a plenum.

Figure 8:
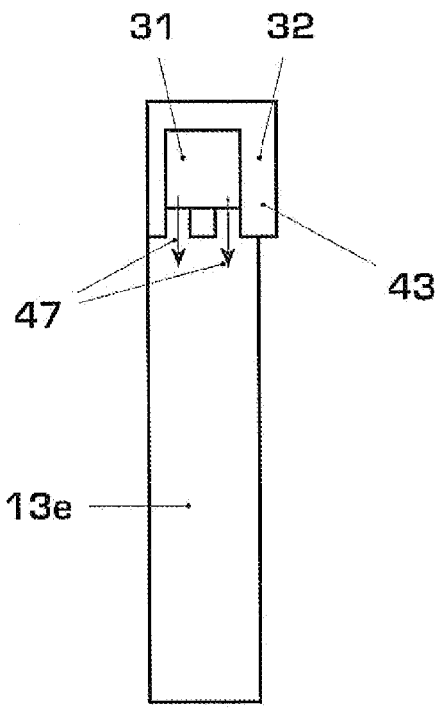
FIG. 8 shows a leaf with integral spacer, a through-hole for forming a plenum and air-guide passages according to another preferred exemplary embodiment of the invention.

If—as in the case of FIG. 8—an integral spacer 32 (having an asymmetrical arm 43) is used, the plenum and the directional air feed can be achieved by a through-hole 31 and passages 47 starting therefrom. The air then flows in the direction of the depicted arrows through the passages 47 into the gap between the adjacent leaves.

Figure 9:
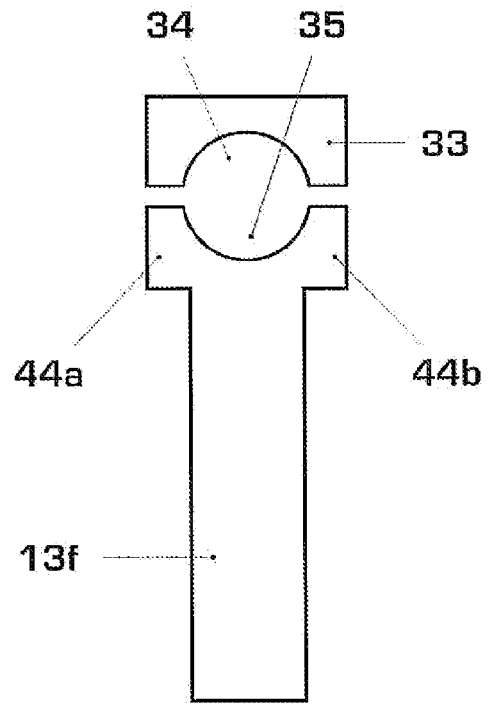
FIG. 9 shows a leaf with associated separate spacer for forming a plenum and controlling the air feed according to another preferred exemplary embodiment of the invention.
Figure 10:
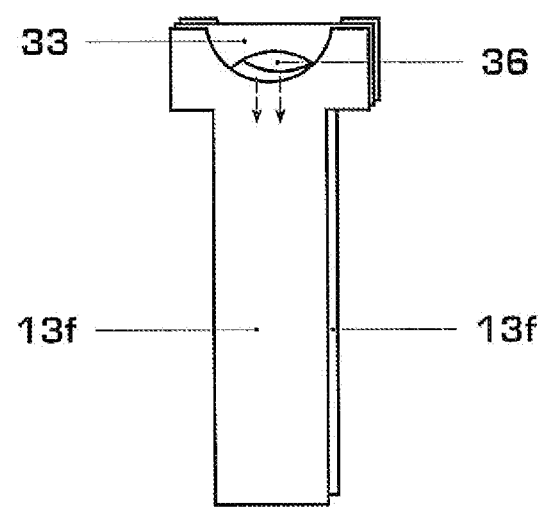
FIG. 10 shows the alternative arrangement of leaf and spacer from FIG. 9.
Figure 11:
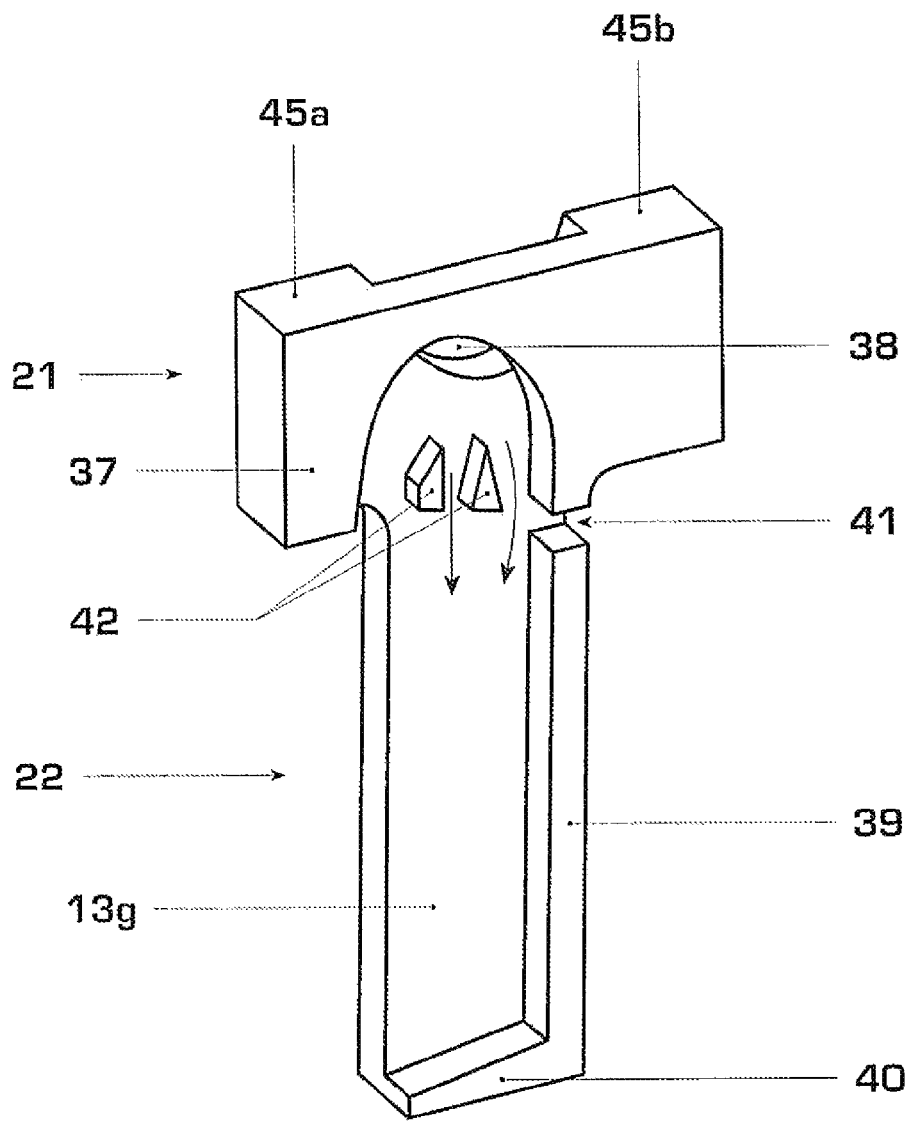
FIG. 11 shows a leaf with integral spacer and additional ribs for stiffening and for air guidance according to another preferred exemplary embodiment of the invention.

If—as in the case of FIGS. 9 and 10—separate spacers 33 are used, the plenum and the directional air feed can be achieved by a superimposition of semicircular recesses 34, 35 or comparable geometries in the alternately arranged leaves 13*f* and spacers 33.

Figure 4:
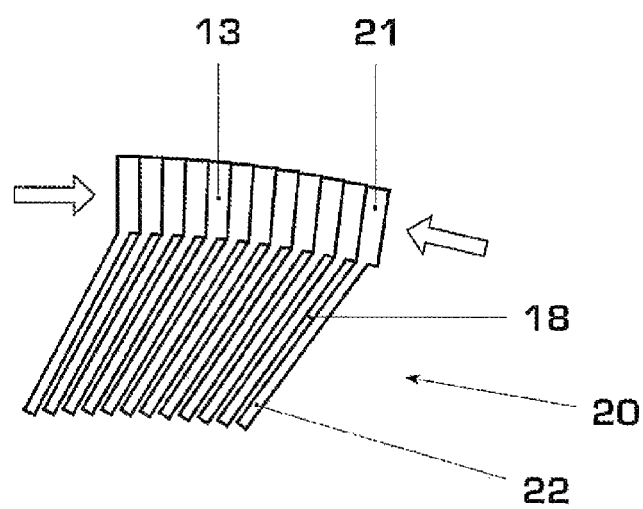
FIG. 4 shows, as viewed in the axial direction, a stack of leaves with sealing parts, tilted relative to the tip direction, according to a preferred exemplary embodiment of the invention.

Furthermore, for putting the leaves together exactly and for facilitated connection of the leaves, it may be advantageous if, according to FIG. 4, the head part 21 of the leaves is oriented in the radial direction, whereas the sheet-like sealing part 22, in contrast, is inclined by a suitable angle. In particular, the pressure forces which are indicated by block arrows in FIG. 4 and which are applied during the assembly of the leaf seal 20 in order to ensure the tightest packing do not cause the leaves to slip relative to one another (this is not the case if head part 21 and sealing part 22 are located in one plane). The geometry shown in FIG. 4 also enables the entire surface of the integral spacers to be used for the connection of the leaves.

The process—photochemical or other process—for producing (structuring) the leaves may also be used to produce additional elements for influencing the mechanical and/or fluidic properties of the leaf. According to FIG. 11, such additional elements may be designed as ribs 39, 40 which run on a longitudinal edge and on the bottom transverse edge and merge into one another at a corner of the leaf 13*g*. The ribs 39, 40 increase the rigidity of the leaf 13*g*, reduce the axial air loss, prevent twisting of the leaves and assist the guidance of the air flow during the upward or downward blowing effect.

The ribs 39, 40 can be formed during the processing of the leaves 13*g* together with the integral spacer 37, which likewise has lateral arms 45*a* and 45*b* and a through-hole 38 for forming a plenum. Furthermore, baffle elements 42 for the radial air flow may be formed. Furthermore, the rigidity of the leaves 13*g* can be influenced by forming a hinge region 41 (reduced in thickness) between the integral spacer 37 and the rib 39. The rib 39 running on the longitudinal edge ends in front of the head part 21 of the leaf 13*g*. The sealing part 22 of the leaf 13*g* can be comparatively stiff on account of the rib 39, whereas the elastic flexibility of the leaf in the radial direction is still retained due to the hinge region 41.

What is claimed is:

1. A leaf seal for sealing a shaft rotating about an axis, comprising:
    a plurality of individual and separate leaves disposed spaced-apart from each other in a concentric circle around the axis and in a fixed position so as to form a plurality of gaps between each of the plurality of leaves, each of the leaves having a surface oriented essentially parallel to the axis from one end to the other and a width extending along the axis and having an integrally formed positioning element configured to position and retain the respective leaf in the leaf seal, the positioning element including at least one laterally projecting arm, wherein the least one arm is of asymmetrical design relative to a center line in a longitudinal direction of the respective leaf and wherein each of the plurality of gaps extends over the entire axial width of each of the respective plurality of leaves; and additional elements disposed on the leaves and configured to influence at least one of a mechanical and a fluidic property of the respective leaf, wherein the additional elements are formed as a first rib running on a longitudinal edge and a second rib running on a bottom transverse edge of the respective leaf.

2. The leaf seal as recited in claim 1, wherein the first and second ribs merge into one another at a corner of the leaf.

3. The leaf seal as recited in claim 1, wherein the leaf includes a head part, the leaf being fastened in the leaf seal at the head part and wherein the first rib ends in front of the head part.

4. A leaf seal for sealing a shaft rotating about an axis, comprising:

a plurality of spaced-apart leaves disposed in a concentric circle around the axis and in a fixed position so as to form a plurality of gaps between each of the plurality of spaced-apart leaves, each of the leaves having a surface oriented essentially parallel to the axis and a width extending along the axis from one end to the other and having an integrally formed positioning element configured to position and retain the leaves in the leaf seal, the positioning element including at least one laterally projecting arm, wherein each of the plurality of gaps extends over the entire axial width of each of the respective plurality of leaves; and additional elements formed as a first rib running on a longitudinal edge and a second rib running on a bottom transverse edge of the respective leaf disposed on the leaves and configured to influence at least one of a mechanical and a fluidic property of the respective leaf.

5. The leaf seal as recited in claim 4, wherein the first and second ribs merge into one another at a corner of the leaf.

6. The leaf seal as recited in claim 4, wherein the leaf includes a head part, the leaf being fastened in the leaf seal at the head part and wherein the first rib ends in front of the head part.

\* \* \* \* \*